PLASTISOL COMPOSITION COMPRISING A THERMOPLASTIC VINYL RESIN AND FILTER CAKE

Leonard E. Edelman, Penn Township, Allegheny County, and James W. Forbes, Jeannette, Pa., assignors to Westinghouse Electric Corporation, East Pittsburgh, Pa., a corporation of Pennsylvania No Drawing. Filed July 23, 1956, Ser. No. 599,305

5 Claims. (Cl. 260—31.8)

This invention relates to polyvinyl plastisols and particularly to the formulation of same.

In the manufacture of plasticizers, such as dibutyl phthalate and dioctyl phthalate, contaminants and colorants present therein are removed by the addition of a filter-aid, such as diatomaceous earth, and subsequent filtration. The resulting filter cake comprises the filter-aid with a substantial amount of plasticizer dispersed therethrough.

It has been discovered that the filter cake, which has heretofore been discarded as waste material, can be employed in the manufacture of high quality polyvinyl plastisols at a considerable reduction in cost.

The object of this invention is to provide a polyvinyl plastisol composition comprising as its essential ingredients a finely divided polyvinyl resin, a plasticizer for said polyvinyl resin, and a finely divided filler, said plasticizer and said filler being supplied at least in substantial part as filter cake comprising a finely divided filter-aid having dispersed therethrough a plasticizer, said filter cake being a waste product from the manufacture of plasticizers.

Other objects of the invention will, in part, be obvious, and will, in part, appear hereinafter.

For a fuller understanding of the nature and objects of the invention, reference should be had to the following detailed description.

Polyvinyl plastisols, as is well known in the art, are essentially suspensions of finely divided thermoplastic polyvinyl resins in a liquid plasticizer. The thermoplastic polyvinyl resins that may be employed in the plastisol composition of this invention are well known and include polyvinyl chloride, polyvinyl acetate, copolymers of vinyl chloride and vinyl acetate, polyvinyl acetal, polyvinyl butyral, polyethylene, polyvinylidene chloride, and the like, or mixtures of two or more.

Referring to the plasticizer which makes up the liquid vehicle of the plastisol, it comprises one or more high-boiling organic liquids, generally having a boiling point of above about 200° C., in which the vinyl resin particles are substantially insoluble at ordinary temperatures, but in which at an elevated temperature, the particles will flux and dissolve to form a single phase, resinous mass. Since the plasticizer is substantially non-volatile, substantially all thereof enters into and becomes part of the resinous mass. Examples of suitable plasticizers are the phthalates, such as dicyclohexyl phthalate, dibutoxyethyl phthalate, butyl cyclohexyl phthalate, cyclohexylamyl phthalate, diethoxyethyl phthalate, dibutyl phthalate, dicapryl phthalate, dioctyl phthalate, and diallyl phthalate; the sebacates such as dibutyl sebacate, dibenzyl sebacate, dimethyl sebacate, dioctyl sebacate, and glycol sebacate; the organic triphosphates such as triethyl phosphate, tri-2-ethylhexyl phosphate, tributyl phosphate, tri-p-tert-butylphenyl phosphate, triphenyl phosphate, tricresyl phosphate, and tributoxyethyl phosphate. Mixtures of two or more of the plasticizers may be employed if desired. The above plasticizers are often referred to in the art as "primary plasticizers."

The amount of plasticizer employed in preparing a polyvinyl plastisol composition will vary depending upon the particular plasticizer, the particular polyvinyl resin, and upon the particuar additives, of the types discussed below. The resin will be present in an amount at least to provide, upon fluxing of the particles thereof, a resinous product having the desired physical properties, such as toughness, flexibility and abrasion resistance. The minimum amount of polyvinyl resin required for this purpose will also vary depending upon the above-mentioned factors. Thus, bearing the variables in mind, it may be stated that the ratio by weight of the plasticizer to the polyvinyl resin will be from about 1:1 to 2:1. The preferred ratio by weight will be from about 1.25:1 to 1.75:1.

Secondary plasticizers, so called because they have limited compatibility with polyvinyl resins, but are compatible with and extend the primary plasticizers, may be added to vinyl plastisols to improve low temperature flexibility of vinyl plastisols, improve flame resistance and the like. Examples of secondary plasticizers that may be employed in compounding vinyl plastisol compositions are methyl acetyl ricinoleate, butyl acetyl ricinoleate, methyl Cellosolve acetyl ricinoleate, tetrahydrofurfuryl oleate, tetraethylene glycol di-isohexoate, methyl pentachlorostearate, chlorinated paraffins, mineral oil, and the like. Mixtures of two or more may be employed if desired. Secondary plasticizers are not an essential ingredient of vinyl plastisol compositions. If they are employed to provide additional properties to the vinyl plastisol composition, the ratio by weight of the secondary plasticizer to the primary plasticizer will be from about 0.1:1 to 0.4:1.

Ordinarily, vinyl plastisols will contain small amounts of other ingredients, such as heat-stabilizing agents and fillers, to provide special properties.

Heat-stabilizing agents are added to prevent degradation of the polyvinyl plastisol composition due to heat or light. The ratio by weight of the heat-stabilizing agent to the polyvinyl resin will generally be within the range of about 0.02:1 to 0.5:1.

Examples of such heat-stabilizing agents are lead compounds, such as lead silicate, lead titanate, basic lead carbonate, lead stearate, and lead oleate; bismuth oxides; the alkaline earth metal compounds such as the soaps, for instance, calcium stearate and barium ricinoleate, the oxides, for instance, barium oxide, the silicates, for instance, calcium silicate, the resinates, for instance, calcium resinate; cadmium ricinoleate; organic compounds such as the epoxy esters, for instance, epoxidized soybean oil, benzyl epoxystearate, and cyclohexyl epoxystearate; and water-insoluble organic amines. Mixtures of two or more of these stabilizing agents may be employed if desired. The amount of stabilizer employed may vary widely since, as will be noted from the above, certain of the compounds mentioned may also function as a filler and some may also function as a stabilizer.

Finely divided inorganic fillers are added to vinyl plastisols to reduce cost and to control the liquid flow properties of the plastisol. Examples of fillers include calcium carbonate, charcoal, diatomaceous earth, silica flour, aluminum silicates, and mica powder. The ratio by weights of the filler to the polyvinyl resin will generally be from about 2.5:1 to 4:1.

Vinyl plastisols can be modified further by the addition of a gelling agent such as various metallic soaps and organophilic fillers. Such modified vinyl plastisols are of a putty-like consistency, yet flow readily under moderate pressures. Vinyl plastisols modified in this manner are referred to in the art as "plastigels" and are especially adapted to molding, extruding, and calendering. The ratio by weights of the gelling agent to the polyvinyl resin will generally be within the range of about from 0.01:1 to 0.08:1.

Examples of suitable gelling agents are metallic soaps such as aluminum, sodium, calcium, magnesium and lithium stearates. Metallic soaps also act as stabilizers against heat degradation.

Suitable organophilic fillers that may be employed as gelling agents for vinyl plastisols are the bentonite-amine base reaction products. The bentonite-amine base reaction products are composed of a montmorillonite mineral in which at least a part of the cation content of the mineral has been replaced by a cation of an organic base. Clays that contain as a primary constituent a mineral of the group known as montmorillonites are generally referred to as bentonites. Bentonites in their raw state are hydrophilic but upon reacting with organic bases or their salts become organophilic products.

More specifically, a bentonite clay of the character described and exhibiting substantial base-exchange capacity is reacted with an organic compound, more particularly one generally known as an onium compound, by substituting for the clay cation the cation of the organic compound. The reaction product may be prepared not only from a base-salt reacted with a clay-salt, but from a free base reacted with an acid clay.

Examples of organic base compounds and their salts are salts of aliphatic, cyclic, aromatic, and heterocyclic amines; primary, secondary, and tertiary amines and polyamines; also quaternary ammonium compounds, as well as other monovalent or polyvalent onium compounds.

Aliphatic amine salts having from 12 to 20 carbon atoms, for example, hexadecyl amine salts and octadecyl amine salts, yield excellent results. The ratio of the amine compound to bentonite may be varied within certain limits in converting the bentonite to the organophilic condition. In general, however, it is desired to react the amine salt with the bentonite in the approximate ratio of 100 milliequivalents of amine salt to 100 grams of bentonite. Reaction products produced within this ratio give the maximum swelling a stested in nitrobenzene.

It is to be understood that when reference is made to basic organic onion compounds such as amines, it is implied that before reacting with the clay by base-exchange, the amine is converted to the onium form either by the addition of acid or by reason of the fact that some part of the inorganic base in the maturally occurring clay consists of hydrogen.

Example I

An example of the preparation of a suitable bentonite-amine reaction product is as follows:

One thousand grams of a Wyoming bentonite is dispersed in 24.45 liters of water, and the slurry formed is allowed to stand for two hours to settle out the non-clay impurities. In a separate vessel, 54.37 grams of glacial acetic acid is added to 240 grams of octadecyl amine, and the amine salt is then dissolved in 1.45 liters of warm water. Upon addition of the amine salt solution to the dispersed bentonite, flocculation occurs and the precipitate, after being filtered, washed, dried and pulverized, constitutes the bentonite-organic base reaction product.

Other examples of suitable onium compounds and processes indicating how a bentonite-organic base reaction product may be prepared are found in the patent to Jordan 2,531,440, issued November 28, 1950, and the patent to Hauser 2,531,427, issued November 28, 1950.

Plasticizers employed in the manufacture of vinyl plastisols comprise a substantial portion of the plastisol composition and are relatively expensive. In preparing the vinyl plastisol composition of this invention, advantage is taken of a heretofore waste product of the manufacture of plasticizers.

The waste product employed in preparing the plastisols of this invention is filter cake which comprises a substantial amount of a plasticizer and a filter-aid such as finely divided charcoal, diatomaceous earth, and the like. The filter cake contains various contaminants and colorants. The filter cake resulting from the filtration comprises from 40% to 60% by weight of plasticizer. The filter cake is employed in this invention to provide a substantial portion of plasticizer and filler to the vinyl plastisol composition being prepared, the filler being the finely divided filter-aid.

Example II

In the manufacture of dioctyl phthalate, finely divided charcoal is added as a filter-aid to remove the contaminants and colorants therefrom. The dioctyl phthalate with the added filter-aid is then filtered by any conventional filtration process. The resulting filter cake comprises finely divided charcoal, from 40% to 60% by weight of dioctyl phthalate and other residues. This filter cake is employed in the formulation of the polyvinyl plastisol compositions of the examples that follow.

Example III

As example of a vinyl plastisol composition in accordance with this invention is as follows:

|  | Pounds |
|---|---|
| Filter cake of Example II | 1.50 |
| Butyl cyclohexyl phthalate (primary plasticizer) | .56 |
| Mineral oil (secondary plasticizer) | .19 |
| Epoxidized soybean oil (stabilizer) | .37 |
| Finely divided calcium carbonate (filler) | 3.63 |
| Finely divided polyvinyl chloride | 1.05 |
| Bentonite-amine reaction product of Example I (gelling agent) | .04 |

The above composition is prepared by mixing together in a Baker Perkins mixer the filter cake, the calcium carbonate, the bentonite-amine reaction product, the epoxidized soybean oil and .35 pounds of the butyl cyclohexyl phthalate for a period of about 20 minutes. To this mixture are added .60 pounds of the polyvinyl chloride and .21 pound of the butyl cyclohexyl phthalate and the mixing continued for a period of about 5 minutes. The mineral oil and the balance of the polyvinyl chloride are then added to the mixture and the mixing is continued for a period of about 15 minutes. The black vinyl plastisol composition of this example is of a putty-like consistency and is often referred to in the art as a "plastigel."

The composition of Example III was applied in a thickness of ¼ inch to a sheet of steel. The sheet of steel with the applied composition was placed in an oven heated to 150° C. for a period of about 10 minutes. Upon removal from the oven the composition showed no signs of sagging. It formed an excellent plastisol coating.

Example IV

Another example of a vinyl plastisol composition in accordance with this invention is as follows:

|  | Pounds |
|---|---|
| Filter cake of Example II | 1.04 |
| Butyl cyclohexyl phthalate (primary plasticizer) | 1.02 |
| Mineral oil (secondary plasticizer) | .19 |
| Epoxidized soybean oil (stabilizer) | .37 |
| Finely divided calcium carbonate (filler) | 3.63 |
| Finely divided polyvinyl chloride | 1.05 |
| Bentonite-amine reaction product of Example I | .04 |
| Finely divided rubber (filler) | .20 |

The above composition is prepared by mixing together in a Baker Perkins mixer the filter cake, the calcium carbonate, the rubber, the bentonite-amine reaction product, the epoxidized soybean oil and .81 pound of the butyl cyclohexyl phthalate for a period of about 20 minutes. To the mixture are added .21 pound of the cyclohexyl phthalate and .60 pound of the polyvinyl chloride and mixing continued for an additional period of about 5 minutes. The mineral oil and the balance of the polyvinyl chloride are added to the mixture and the mixing continued for an additional period of about 15 minutes. The vinyl plastisol composition of this example is of a putty-like consistency and is often referred to in the art as a "plastigel."

The composition of Example IV was applied to a sheet of steel in a thickness of about ¼ inch. The sheet of steel with the applied composition was placed in an oven heated to 150° C. for a period of about 10 minutes. Upon removal from the oven the composition showed firm adherence to the steel sheet and there were no signs of sagging.

The adhesive properties of the vinyl plastisol composition of this invention can be improved substantially by the addition of a low molecular weight polymer of alpha methyl styrene in an amount of from 20% to 60% based on the weight of the plasticizer.

*Example V*

An example of a preferred composition employing alpha methyl styrene is as follows:

|  | Pounds |
|---|---|
| Filter cake of Example II | 1.04 |
| A low molecular weight polymer of alpha methyl styrene | .70 |
| Butyl cyclohexyl phthalate | .42 |
| Mineral oil | .21 |
| Epoxidized soybean oil | .41 |
| Finely divided calcium carbonate | 3.63 |
| Finely divided polyvinyl chloride resin | 1.05 |
| Bentonite-amine reaction product of Example I | .04 |

The above composition is prepared by mixing in a Baker Perkins mixer for a period of about 20 minutes the calcium carbonate, the bentonite-amine reaction product, the epoxidized soybean oil, the butyl cyclohexyl phthalate and .48 pound of the alpha methyl styrene. The balance of the alpha methyl styrene and .60 pound of the polyvinyl chloride are then added to the mixture and mixing continued for about 5 minutes. The mineral oil and the balance of the polyvinyl chloride are then added and mixing continued for about 15 minutes. A vinyl plastisol composition, or a plastigel as it is often referred to in the art, having a putty-like consistency is obtained which possesses good adhesive properties.

*Example VI*

In the manufacture of dibutyl phthalate, finely divided diatomaceous earth is added as a filter-aid to remove the colorants and contaminants therefrom. The dibutyl phthalate with the added filter-aid is then filtered by any conventional filtration process. The resulting filter cake comprises finely divided diatomaceous earth, from 40% to 60% by weight of dibutyl phthalate and other residues. This filter cake is employed in the polyvinyl plastisol composition of the example that follows.

*Example VII*

An example of a vinyl plastisol composition in accordance with this invention is as follows:

|  | Pounds |
|---|---|
| Filter cake of Example VI | 1.50 |
| Butyl cyclohexyl phthalate | .56 |
| Mineral oil | .19 |
| Epoxidized soybean oil | .37 |
| Finely divided calcium carbonate | 3.63 |
| Finely divided polyvinyl chloride | 1.05 |
| Bentonite-amine reaction product of Example I | .04 |

The above composition is prepared by mixing together in a Baker Perkins mixer the filter cake, the calcium carbonate, the bentonite-amine reaction product, the epoxidized soybean oil and .35 pound of the butyl cyclohexyl phthalate for a period of about 20 minutes. To this mixture are added .60 pound of the polyvinyl chloride and .21 pound of the butyl cyclohexyl phthalate and the mixing continued for a period of about 5 minutes. The mineral oil and the balance of the polyvinyl chloride are then added to the mixture and the mixing continued for a period of about 15 minutes. The vinyl plastisol composition of this example is of a putty-like consistency.

Since certain changes can be made in the above invention without departing from the scope thereof, it is intended that all matter contained in the above description shall be interpreted as illustrative and not in a limiting sense.

We claim as our invention:

1. A vinyl plastisol composition comprising as its essential ingredients (A) a finely divided thermoplastic polyvinyl resin selected from at least one of the group consisting of polyvinyl chloride, polyvinyl acetate, polyvinyl acetal, polyvinyl butyral, polyethylene, polyvinylidene chloride, and copolymers of vinyl chloride and vinyl acetate, (B) a high boiling point liquid organic ester plasticizer in which said polyvinyl resin is insoluble except at elevated temperatures, (C) a finely divided inorganic filler selected from at least one of the group consisting of calcium carbonate, silica flour, aluminum silicate, and mica flour, and (D) a filter cake comprising (1) a finely divided filter-aid selected from the group consisting of charcoal and diatomaceous earth, and (2) an organic ester plasticizer selected from the group consisting of dibutyl phthalate and dioctyl phthalate, said organic ester plasticizer (2) being dispersed throughout the filter cake, the weight ratio of plasticizer (B) plus plasticizer (2) to said polyvinyl resin being within the range of about from 1.25:1 to 1.75:1, and the weight ratio of filler (C) plus filter-aid (1) to said polyvinyl resin being within the range of about from 2.5:1 to 4:1.

2. A vinyl plastisol composition comprising as its essential ingredients (A) a finely divided thermoplastic polyvinyl resin selected from at least one of the group consisting of polyvinyl chloride, polyvinyl acetate, polyvinyl acetal, polyvinyl butyral, polyethylene, polyvinylidene chloride, and copolymers of vinyl chloride and vinyl acetate, (B) a high boiling point liquid organic ester plasticizer in which said polyvinyl resin is insoluble except at elevated temperatures, (C) a finely divided inorganic filler selected from at least one of the group consisting of calcium carbonate, silica flour, aluminum silicate, and mica flour, (D) a filter cake comprising (1) a finely divided filter-aid selected from the group consisting of charcoal and diatomaceous earth, and (2) an organic ester plasticizer selected from the group consisting of dibutyl phthalate and dioctyl phthalate, said organic ester plasticizer (2) being dispersed throughout the filter cake, and (E) a heat-stabilizing agent, the weight ratio of plasticizer (B) plus plasticizer (2) to said polyvinyl resin being within the range of about from 1.25:1 to 1.75:1, the weight ratio of filler (C) plus filter-aid (1) to said polyvinyl resin being within the range of about from 2.5:1 to 4:1, and the weight ratio of heat stabilizing agent (E) to said polyvinyl resin being within the range of about 0.02:1 to 0.5:1.

3. A vinyl plastisol composition comprising (A) a finely divided thermoplastic polyvinyl resin selected from at least one of the group consisting of polyvinyl chloride, polyvinyl acetal, polyvinyl butyral, polyethylene, polyvinylidene chloride, and copolymers of vinyl chloride and vinyl acetate, (B) a high boiling point liquid organic ester plasticizer in which said polyvinyl resin is insoluble except at elevated temperatures, (C) a finely divided inorganic filler selected from at least one of the group consisting of calcium carbonate, silica flour, aluminum silicate, and mica flour, (D) a filter cake comprising (1) a finely divided filter-aid selected from the group consisting of charcoal and diatomaceous earth, and (2) an organic ester plasticizer selected from the group consisting of dibutyl phthalate and dioctyl phthalate, said organic ester plasticizer (2) being dispersed throughout the filter cake, (E) a heat-stabilizing agent, and (F) a gelling agent selected from the group consisting of metallic soaps and bentonite-amine base reaction products for said plasticizers (B) and (2), the weight ratio of plasticizer (B) plus plasticizer (2) to said polyvinyl resin being within the range of about from 1.25:1 to 1.75:1, the weight ratio of filler (C) plus filter-aid (1) to said polyvinyl resin being within the range of about from 2.5:1 to 4:1, the weight ratio of heat stabilizing agent (E) to said polyvinyl resin being within the range of about 0.02:1 to 0.5:1, and the weight ratio of said gelling agent (F) to said polyvinyl resin being within the range of about from 0.01:1 to 0.05:1.

4. The vinyl plastisol composition of claim 3 wherein the gelling agent (F) is a bentonite-amine base reaction product.

5. A composition as set forth in claim 3 which also contains a low molecular weight polymer of alpha methyl styrene in an amount equal to from about 20% to 60% of the composition, based on the weight of plasticizer (B) plus plasticizer (2).

References Cited in the file of this patent

UNITED STATES PATENTS

| | | |
|---|---|---|
| 1,946,597 | Symonds | Feb. 13, 1934 |
| 2,739,067 | Ratcliffe | Mar. 20, 1956 |
| 2,753,314 | Severs et al. | July 3, 1956 |

OTHER REFERENCES

Perloff: Rubber Age, October 1951, pages 63–67.